July 19, 1932.  H. G. THOMPSON  1,868,032
BATTERY HOLDDOWN
Filed May 27, 1929
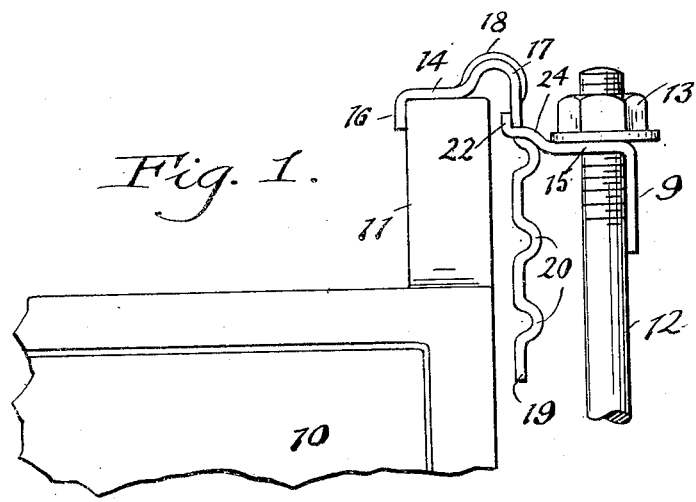
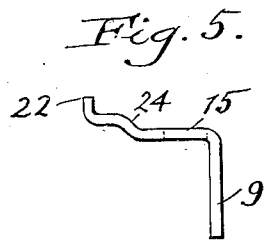
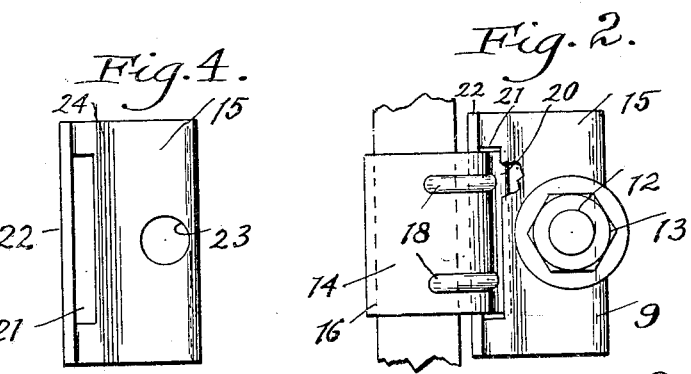
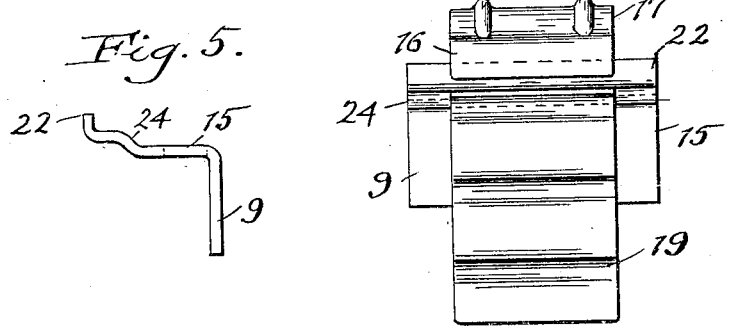
Inventor.
Henry G. Thompson
Knox Hudson & Kent
Attys.

Patented July 19, 1932

1,868,032

UNITED STATES PATENT OFFICE

HENRY G. THOMPSON, OF CLEVELAND, OHIO, ASSIGNOR TO WILLARD STORAGE BATTERY COMPANY, OF CLEVELAND, OHIO A CORPORATION OF WEST VIRGINIA

BATTERY HOLD-DOWN

Application filed May 27, 1929. Serial No. 366,487.

This invention relates to improvements in battery hold-downs, particularly hold-downs having relatively adjustable parts permitting use upon a given hold-down bolt for retaining in place batteries of varying heights.

One of the objects of the invention is the provision of a simple and effective two-part hold-down capable of being adjusted by simple manipulation without the use of fastenings.

Another object is the provision of a device of this character in which the bracket member is not weakened by slots or notches.

Other objects and features of novelty will appear as I proceed with the description of that embodiment of the invention which, for the purpose of the present application, I have illustrated in the accompanying drawing, in which:

Fig. 1 is a side elevational view of a hold-down embodying the invention, together with fragments of a battery and hold-down bolt in connection with which the invention is used.

Fig. 2 is a top plan view of the same.

Fig. 3 is a rear elevational view of the hold-down.

Figs. 4 and 5 are top plan and side elevational views, respectively, of the hook member of the device.

In the drawing, I have shown at 10 a fragment of a storage battery and one of the handles 11 thereof. A hold-down bolt of usual construction is illustrated at 12, being provided with a clamping nut 13. This bolt is preferably mounted at its lower end in a relatively fixed part of the chassis of an automobile, and is usually capable of more or less swinging movement about that point of connection.

The hold-down of the present invention is made in two parts, which are preferably sheet metal stampings of fairly heavy gauge material. These parts, shown at 14 and 15 in the drawing, I term the bracket member and the hook member, respectively. The upper part of the bracket member is adapted to extend across and rest upon the top of the handle 11 of the battery, and is provided with a down-turned flange 16 for engagement with the inner side of the handle. On the side opposite the flange 16, the bracket member is formed preferably with an upward roll 17. A pair of spaced ribs 18 may be pressed into this roll transversely of the same in order to receive between them special hook members, such as are sometimes placed upon the hold-down bolts by car makers. In such event, the hook member 15 would not be used. Extending downwardly from the outer edge of roll 17 is a strap 19 which is provided with a plurality of corrugations extending transversely of the strap and forming humps 20.

The hook member 15 is wider than the bracket member, and has a slot 21 cut therein of length and width sufficient to loosely receive the strap 19 and enable the hook member to be worked up and down the strap when manipulated by rocking movements at the humps. On the inner side of the hook member beyond the slot 21 there is an upturned flange 22 which is adapted to bear against the inner side of the strap 19. The hook member has a hole 23 cut therein to fit loosely around the bolt 12. Just beyond this bolt hole the outer portion of the hook member has a down-turned flange 9 for engagement with the shank of the bolt in order to assist in preventing cocking of the hook member when clamping pressure is applied through the nut 13. Just outwardly of the slot 21, the hook member is turned downwardly in a curve substantially concentric with the curvature of the humps 20. This portion of the hook member, numbered 24 in the drawing, is hereinafter referred to as a saddle. It is adapted to rest upon the hump 20 with which it is in contact, and to transmit pressure downwardly to that hump.

The operation of the device will be obvious to those skilled in the art from the above description of its construction. When a battery is put in position in an automobile having a pair of hold-down bolts 12, a two-part hold-down is connected between each of the battery handles and the corresponding hold-down bolt. Before applying the hold-down the hook member 15 is moved along the strap 19 until it engages with the upper side of the proper hump 20, the adjustment depending upon the height of the handle 11 above the support upon which the battery rests. The hole 23 in the hook member is then caused to receive the upper end of the bolt 12, and the two-part hold-down is moved downwardly until the bracket 14 engages the handle 11. Thereafter the nut 13 is threaded downwardly upon the bolt until it engages and exerts clamping pressure upon the top of the hook member 15. This pressure is transmitted to the strap 19 through the saddle 24 and hump 20, thereby causing the upper portion of bracket 14 to exert a downward pull upon the handle 11 and thus hold the battery firmly in position. Assuming that the parts are set as in Fig. 1, and that a battery of greater height is to be substituted for the one illustrated, then the hook member 15 is moved downward until it engages one of the lower humps 20, after which the hold-down is applied as before. This adjustment is very quickly and easily performed, and requires no tools. Furthermore, no fastenings are employed for holding the parts in adjusted position.

While in the foregoing specification and in the accompanying drawing, I have described the invention more or less in detail, I desire it to be understood that such detailed disclosure is primarily for the purpose of fully illustrating the invention, and is not to be construed as amounting to a limitation upon the scope thereof.

Having thus described my invention, I claim:

1. A battery hold-down comprising a bracket member adapted to engage a battery, said bracket member having a depending strap, a plurality of humps spaced along the length of said strap, and a hook member adapted to be engaged by a hold-down bolt, said hook member having a saddle adapted to seat upon any one of said humps, said hook member also having a slot therethrough in which said strap is adjustable up and down.

2. A battery hold-down comprising a bracket member adapted to engage a battery, said bracket member having a depending strap, a plurality of humps spaced along the length of said strap, a hook member adapted to be engaged by a hold-down bolt, said hook member having a saddle adapted to seat upon any one of said humps, and means permitting adjustment of the hook member longitudinally of the strap member but preventing relative lateral movement between said strap and hook member.

3. A battery hold-down comprising a bracket member adapted to engage a battery, said bracket member comprising a depending metal strap corrugated to form a plurality of humps extending transversely across the strap, and a hook member adapted to be engaged by a hold-down bolt, said hook member having a saddle adapted to seat upon any one of said humps, said hook member also having a slot therethrough in which said strap is adjustable up and down.

In testimony whereof, I hereunto affix my signature.

HENRY G. THOMPSON.